US011609436B2

(12) United States Patent
Seo et al.

(10) Patent No.: US 11,609,436 B2
(45) Date of Patent: Mar. 21, 2023

(54) FOLDED OPTICS REFLECTING MODULE

(71) Applicant: Samsung Electro-Mechanics Co., Ltd., Suwon-si (KR)

(72) Inventors: Bo Sung Seo, Suwon-si (KR); Bong Won Jeong, Suwon-si (KR); Nam Ki Park, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 443 days.

(21) Appl. No.: 16/810,082

(22) Filed: Mar. 5, 2020

(65) Prior Publication Data
US 2020/0363626 A1 Nov. 19, 2020

(30) Foreign Application Priority Data

May 16, 2019 (KR) .......................... 10-2019-0057707
Sep. 2, 2019 (KR) .......................... 10-2019-0108010

(51) Int. Cl.
*G02B 27/64* (2006.01)
*H04N 5/225* (2006.01)
(Continued)

(52) U.S. Cl.
CPC ......... *G02B 27/646* (2013.01); *G02B 7/1805* (2013.01); *G02B 13/0065* (2013.01); *G03B 5/06* (2013.01); *G03B 17/17* (2013.01); *G03B 30/00* (2021.01); *H04N 5/2254* (2013.01); *G03B 2205/0023* (2013.01)

(58) Field of Classification Search
CPC ........................................... G02B 27/646–648
See application file for complete search history.

(56) References Cited

U.S. PATENT DOCUMENTS 10,516,773 B2  12/2019  Yoon et al.
10,534,194 B2  1/2020   Lee et al.
(Continued)

FOREIGN PATENT DOCUMENTS

CN  102081228 A   6/2011
CN  104519265 A   4/2015
(Continued)

OTHER PUBLICATIONS

Korean Office Action dated Dec. 4, 2020 in counterpart Korean Patent Application No. 10-2019-0108010 (8 pages in English and 6 pages in Korean).
(Continued)

*Primary Examiner* — Leon W Rhodes, Jr.
(74) *Attorney, Agent, or Firm* — NSIP Law

(57) ABSTRACT

A reflecting module includes: a housing; a rotation holder supported by the housing, and including an inclined seating portion; and a reflective member disposed on the inclined seating portion. The rotation holder is rotatable with respect to a first axis perpendicular to an optical axis of the housing, and with respect to a second axis perpendicular to the optical axis and the first axis. The first and second axes cross an inside of a rectangular parallelepiped having a surface coinciding with a surface of the reflective member, and the reflective member interfaces with the seating portion along a diagonal plane within the parallelepiped.

18 Claims, 10 Drawing Sheets

(51) Int. Cl.
   *G03B 17/17*   (2021.01)
   *G03B 30/00*   (2021.01)
   *G02B 7/18*    (2021.01)
   *G03B 5/06*    (2021.01)
   *G02B 13/00*   (2006.01)

(56) References Cited

U.S. PATENT DOCUMENTS

| | | | |
|---|---|---|---|
| 10,564,442 | B2 | 2/2020 | Seol et al. |
| 11,268,829 | B2* | 3/2022 | Yedid ................. H04N 5/23296 |
| 11,327,290 | B2* | 5/2022 | Li ........................ G02B 7/1805 |
| 2011/0128601 | A1 | 6/2011 | Yamada et al. |
| 2015/0002683 | A1 | 1/2015 | Hu et al. |
| 2016/0116758 | A1 | 4/2016 | Nomura et al. |
| 2018/0067335 | A1 | 3/2018 | Chen et al. |
| 2018/0109660 | A1* | 4/2018 | Yoon ................. G02B 13/0035 |
| 2018/0224665 | A1 | 8/2018 | Im et al. |
| 2018/0239161 | A1 | 8/2018 | Seol et al. |
| 2018/0239162 | A1 | 8/2018 | Lee et al. |
| 2018/0275395 | A1 | 9/2018 | Reddy et al. |
| 2018/0329276 | A1 | 11/2018 | Hu et al. |
| 2018/0356645 | A1 | 12/2018 | Jeong et al. |
| 2018/0367714 | A1 | 12/2018 | Im et al. |
| 2019/0227199 | A1 | 7/2019 | Kao et al. |
| 2020/0379238 | A1* | 12/2020 | Li ........................ G02B 7/1805 |
| 2021/0255368 | A1* | 8/2021 | Hu ........................... G02B 7/09 |

FOREIGN PATENT DOCUMENTS

| | | |
|---|---|---|
| CN | 105549296 A | 5/2016 |
| CN | 106990551 A | 7/2017 |
| CN | 107018299 A | 8/2017 |
| CN | 207424496 U | 5/2018 |
| CN | 108398806 A | 8/2018 |
| CN | 108459450 A | 8/2018 |
| CN | 108873239 A | 11/2018 |
| CN | 208060910 U | 11/2018 |
| CN | 109031689 A | 12/2018 |
| CN | 109343294 A | 2/2019 |
| CN | 110086964 A | 8/2019 |
| JP | 2006-220834 A | 8/2006 |
| JP | 2007-228007 A | 9/2007 |
| JP | 2008-3130 A | 1/2008 |
| JP | 2012-118336 A | 6/2012 |
| JP | 2015-11353 A | 1/2015 |
| JP | 2015-92285 A | 5/2015 |
| JP | 2015-179230 A | 10/2015 |
| JP | 2016-48295 A | 4/2016 |
| JP | 2017-116814 A | 6/2017 |
| KR | 2003-0043873 A | 6/2003 |
| KR | 10-2018-0092251 A | 8/2018 |
| KR | 10-2018-0095420 A | 8/2018 |
| KR | 10-2018-0096073 A | 8/2018 |
| KR | 10-2018-0097228 A | 8/2018 |
| KR | 10-2018-0137277 A | 12/2018 |

OTHER PUBLICATIONS

Chinese Office Action dated Jun. 1, 2021 issued in counterpart Chinese Patent Application No. 202010332645.0 (3 pages in English)(6 pages in Chinese).

Chinese Office Action dated Feb. 7, 2022 in corresponding Chinese Patent Application No. 202010332645.0 (9 pages in English and 8 pages in Chinese).

Korean Office Action dated Jun. 14, 2021 in counterpart Korean Patent Application No. 10-2019-0108010 (9 pages in English and 6 pages in Korean).

Chinese Office Action dated Jun. 17, 2022 in corresponding Chinese Patent Application No. 202010332645.0 (10 pages in English, 11 pages in Chinese).

* cited by examiner

FOLDED OPTICS REFLECTING MODULE

CROSS-REFERENCE TO RELATED APPLICATIONS

This application claims benefit under 35 U.S.C. § 119(a) of Korean Patent Application Nos. 10-2019-0057707 and 10-2019-0108010 filed on May 16, 2019 and Sep. 2, 2019, respectively, in the Korean Intellectual Property Office, the entire disclosures of which are incorporated herein by reference for all purposes.

BACKGROUND

1. Field

The following description relates to a folded optics reflecting module.

2. Description of Related Art

Cameras are commonly employed in portable electronic devices, or mobile terminals, such as smartphones, tablet PCs, laptop computers, and the like. Cameras for mobile terminals have been designed to include multiple functions for enhancing performance, such as an autofocusing function, an image stabilization function, a zoom function, and the like. For example, in such cameras, an actuator may be implemented by vertically moving a lens or an image sensor to adjust a focus of the camera, or by laterally (e.g., to the left or right) tilting or moving the lens or the image sensor for image stabilization.

A recently developed camera module for a mobile terminal having an improved zoom function includes a folded optics reflecting module configured to refract light using a reflective member. The folded optics reflecting module may implement an image stabilization function while simultaneously refracting light using a reflective member.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a reflecting module includes: a housing; a rotation holder supported by the housing, and including an inclined seating portion; and a reflective member disposed on the inclined seating portion. The rotation holder is rotatable with respect to a first axis perpendicular to an optical axis of the housing, and with respect to a second axis perpendicular to the optical axis and the first axis. The first and second axes cross an inside of a rectangular parallelepiped having a surface coinciding with a surface of the reflective member, and the reflective member interfaces with the seating portion along a diagonal plane within the parallelepiped.

The housing may include a support protrusion portion protruding in a direction of the optical axis. A portion of an end of the support protrusion portion may be disposed inside the rectangular parallelepiped.

The reflecting module may further include a driving holder disposed between the housing and the rotation holder.

The reflecting module may further include: a first bearing configured to enable the rotation holder to rotate with respect to the first axis, and disposed between the housing and the driving holder; and a second bearing configured to enable the rotation holder to rotate with respect to the second axis, and disposed between the rotation holder and the driving holder.

The reflecting module may further include: a first pulling member disposed in the housing; a second pulling member disposed in the driving holder; and a third pulling member disposed in the rotation holder. The second pulling member may be configured to generate a pulling force with the first pulling member and the third pulling member.

The second axis may be disposed between the first pulling member and the second pulling member, or the first axis may be disposed between the second pulling member and the third pulling member.

The second pulling member may have a bent shape such that the second pulling member opposes the first pulling member and the third pulling member.

The reflecting module may further include: first ball bearings aligned in either one of a direction of the second axis and a direction of the first axis, and disposed between the housing and the driving holder; and second ball bearings aligned in the direction of the first axis and disposed between the rotation holder and the driving holder.

The reflecting module may further include: a first pulling member disposed in the housing; a second pulling member disposed in the driving holder; and a third pulling member disposed in the rotation holder. The second pulling member may be configured to generate a pulling force with the first pulling member and the third pulling member. The first ball bearings may be disposed between the first pulling member and the second pulling member. The second ball bearings may be disposed between the second pulling member and the third pulling member.

The reflecting module may further include: a first pulling member disposed in the housing; and a second pulling member disposed in the driving holder. The second pulling member may be configured to generate a pulling force with the first pulling member.

The reflecting module may further include bearings disposed between the housing and the driving holder.

The reflecting module may further include: a first magnet configured to provide power to rotate the rotation holder with respect to the first axis; and a second magnet configured to provide power to rotate the rotation holder with respect to the second axis.

The reflecting module may further include: a first coil disposed on a surface parallel to the optical axis and configured to act on the first magnet; and a second coil disposed on a surface perpendicular to the optical axis and configured to act on the second magnet.

The first magnet may be disposed in a position biased toward an end portion of the housing in a direction of the optical axis on a surface of the rotation holder parallel to the optical axis.

The second magnet may be disposed in a position biased toward an end portion of the housing in a direction of the second axis on a surface of the rotation holder perpendicular to the optical axis.

The reflecting module may further include a driving holder disposed between the housing and the rotation holder, and configured to rotate about a pivot protrusion.

The rotation holder may further include a rotary shaft coupled to the driving holder.

The reflecting may further include ball bearings disposed between the housing and the driving holder.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
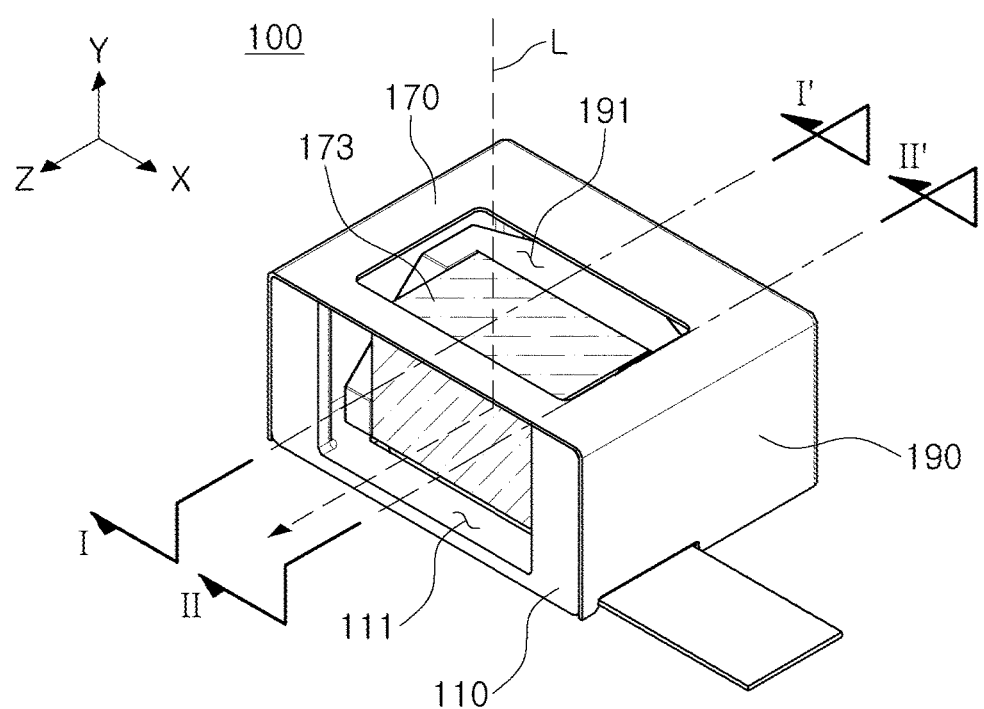
FIG. 1 is a combined perspective view of a folded optics reflecting module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

According to embodiments disclosed herein, a folded optics reflecting module for a camera module is capable of providing a scanning function in addition to image stabilization.

Referring to FIGS. 1 to 4 and 7, a folded optics reflecting module 100 (hereinafter "reflecting module 100"), according to an embodiment, may include a housing 110, a substrate 130, a driving holder 150, a rotation holder 170, and a cover 190. The reflecting module 100 may allow light incident through an incident window 191 in the cover 190 to be reflected by a reflective member 173 so that an angle of a path of the light may be changed, and the light may then exit the reflecting module 100 in the optical axis direction through an emission window 111 formed by the housing 110 and the cover 190.

The reflecting module 100 may be configured such that a wide-angle rotation of the rotation holder 170/reflective member 173 may be performed to utilize a camera to implement a scanning function and a tracking technology on a plane in a manner similar to that of a scanning device. That is, a rotation angle of the rotation holder 170/the reflective member 173 may be sufficiently wide to enable the scanning function and the tracking technology. The reflecting module 100 may implement image stabilization as well as scanning.

The folded optics reflecting module 100 may include a rotary shaft of the driving holder 170 disposed directly below a seating portion 172, which is an inclined/diagonal surface of the driving holder 170, on which the reflective member 173 is disposed to implement a wide-angle rotation. For example, the rotary shaft may be formed to extend in directions of a first axis (X axis) and a second axis (Y axis), respectively, and an entirety of the rotary shaft may be formed directly below or directly above the seating portion 172 of the driving holder 170. As will be described later in greater detail, the rotary shaft of the driving holder 170 may be formed by first ball bearings 113 and second ball bearings 153. For example, the first ball bearings 113 may form a portion of the rotary shaft extending in the Y axis direction, and the second ball bearings 153 may form a portion of the rotary shaft extending in the X axis direction. For example the rotary shaft may be formed to cross an inside of a rectangular parallelepiped A (FIG. 3) having a surfaces coinciding with surfaces of the reflective member 173 are disposed when the reflective member 173 is mounted on the seating portion 172. For example, a side surface (in an XY plane) of the reflective member 173 and an upper surface (in an XZ plane) of the reflective member 173 may be respectively disposed on or respectively correspond to/coincide with two surfaces of the rectangular parallelepiped A, the seating portion 172 may be disposed along a diagonal plane within the parallelepiped A, and the reflective member 173 may interface with the seating portion 172 along the diagonal plane.

The housing 110 may include an internal space 110a, and the driving holder 150 and the rotation holder 170 may be sequentially stacked in the internal space 110a. That is, the rotation holder 170 may be disposed over the driving holder 150 in the Y axis direction. For example, the substrate 130 may be coupled to the housing 110 such that the substrate 130 is disposed on multiple surfaces of the housing 110 and at least partially surrounds the housing 110. An upper portion of the housing 110 may be covered by the cover 190 to cover the internal space.

As described above, incident light may be reflected by the reflective member 173 and emitted from the housing 110 through the emission window 111.

The housing 110 may include through holes 117a and 117b in which first and second driving coils 141b and 143b and first and second position sensors 141c and 143c are respectively disposed such that the first and second driving coils 141b and 143b and the first and second position sensors 141c and 143c are exposed to the internal space 110a. One or more of the first and second driving coils 141b and 143b and the first and second position sensors 141c and 143c may be provided to oppose each of a first magnet 141a and a second magnet 143a.

The first magnet 141a may be disposed in a position biased toward an end portion of the housing 110 in an optical axis direction, and may be disposed on a surface of the rotation holder 170 that is parallel to the optical axis. The second magnet 143a may be disposed in a position biased toward an end portion of the housing 110 in a second axis direction (Y direction), and may be disposed on a surface of the rotation holder 170 that is perpendicular to the optical axis. Accordingly, the first and second magnets 141a and 143a may be disposed at farthest relatively far distance from the rotary shaft to smoothly rotate the rotation holder 170 with a small driving force.

The first driving coil 141b may act on the first magnet 141a, and may be disposed on a surface of the substrate 130 parallel to the optical axis of the housing 110. The second driving coil 143b may act on the second magnet 143a, and may be disposed on a surface of the substrate 130 perpendicular to the optical axis of the housing 110.

The housing 110 may further include a support protrusion portion 112 in which the driving holder 150 is closely rotatably supported in the internal space 110a and protrudes in the optical axis direction.

The support protrusion portion 112 may be a member configured to support the driving holder 150 to rotate with respect to the second axis (Y axis), perpendicular to the optical axis. A first guide groove 112a (FIG. 3) may be formed in an end portion of the support protrusion portion 112, and two or more first ball bearings 113 may be inserted into the first guide groove 112a such that the two or more first ball bearings 113 are aligned in the second axis (Y axis) direction. The first ball bearing 113 may have a spherical or cylindrical shape, and the first guide groove 112a may have a substantially hemispherical or semi-cylindrical shape corresponding to the first ball bearing 113. In addition, a virtual extension line connecting the first ball bearings 113 may cross the inside of the rectangular parallelepiped A, and, accordingly, the rotation holder 170 may have a wide angle of rotation with respect to the second axis (Y axis). At least a portion of the end portion of the support protrusion portion 112 in which the first guide groove 112a is formed may be disposed inside the rectangular parallelepiped A such that the first ball bearing 113 is inserted in the first guide groove 112a inside the rectangular parallelepiped A. A first pulling member 115 may be disposed in the support protrusion portion 112 to generate a pulling force by which the driving holder 150 is closely supported by the support protrusion portion 112. For example, the first pulling member 115 may be molded in the support protrusion portion 112, or the first pulling member 115 may be inserted in a groove in the support protrusion portion 112.

A second pulling member 155 may be disposed in the driving holder 150, and a third pulling member 175 may be disposed in the rotation holder 170. Since the driving holder 150 is to be closely supported by the support protrusion portion 112, and the rotation holder 170 is to be supported by the driving holder 150, the first pulling member 115 and the second pulling member 155 may be a magnet and a yoke (formed of a magnetic material), respectively, and the third pulling member 175 may be a magnet. Alternatively, the first pulling member 115 and the second pulling member 155 may be a yoke (formed of a magnetic material) and a magnet, respectively, and the third pulling member 175 may be a yoke (formed of a magnetic material). Furthermore, since a pulling force is to be applied to both the first pulling member 115 and the third pulling member 175, the second pulling member 155 may be disposed at a position corresponding to both the first pulling member 115 and the third pulling member 175. For example, the second pulling member 155 may include two member portions that are respectively disposed at positions corresponding to the first pulling member 115 and the third pulling member 175, or the second pulling member 155 may be a single member having an integrally formed structure.

The first pulling member 115 and the second pulling member 155 or the second pulling member 155 and the third pulling member 175 may be provided with the first axis or the second axis forming the rotary shaft of the rotation holder 170 therebetween respectively. For example, the second axis (Y axis) may be formed between the first pulling member 115 installed in the support protrusion portion 112 and the second pulling member 155 installed in the driving holder 150, and the first axis (X axis) may be formed between the second pulling member 155 installed in the driving holder 150 and the third pulling member 175 installed in the driving holder 170. With such a structure, since the first axis (X axis) and the second axis (Y axis) are provided between members that rotate relative to one another, the rotary shaft may be precisely implemented.

In addition, the second pulling member 155 may be bent to oppose both the first pulling member 115 and the third pulling member 175. The driving holder 150 in which the second pulling member 155 is installed may also be bent in a shape corresponding to a shape of the driving holder 150.

Furthermore, the first ball bearings 113 may be disposed between the first pulling member 115 and the second pulling member 155, and the two or more second ball bearings 153 may be disposed between the second pulling member 155 and the third pulling member 175.

As described above, the substrate 130 may be coupled to the housing 110 to partially surround surfaces of the housing 110, and the first and second driving coils 141b and 143b and the first and second position sensors 141c and 143c mounted on the substrate 130 may be exposed to the internal space 110a through the through holes 117a and 117b. The substrate 130 may be one of various types of substrates, such as a flexible substrate, a rigid substrate, or a substrate in which a rigid substrate is interconnected with a flexible substrate. In addition, the substrate 130 may include a plurality of separate substrate portions or may be a single substrate that has an integrally formed structure.

The driving holder 150 may be closely coupled to the support protrusion portion 112 of the housing 110. The driving holder 150 may be held against the support protrusion portion 112 in a state in which the first ball bearing 113 is interposed therebetween by a pulling force of the first pulling member 115 disposed in the support protrusion portion 112 and the second pulling member 155 provided in the driving holder 150. The two or more first ball bearings 113 may be aligned in a second axis (Y axis) direction or may have a cylindrical shape. Thus, the driving holder 150 may include a second guide groove 151a disposed on a surface of the driving holder 150 facing the support protrusion portion 112 in an optical axis (Z axis) direction, such that the first ball bearing 113 is inserted in the second guide groove 151a.

In an example, the first ball bearing 113 may have a structure integrally coupled to the driving holder 150 or the support protrusion portion 112. In such an example, a guide groove may be provided only in a counter member of the member in which the first ball bearing 113 is integrally provided.

Figure 2:
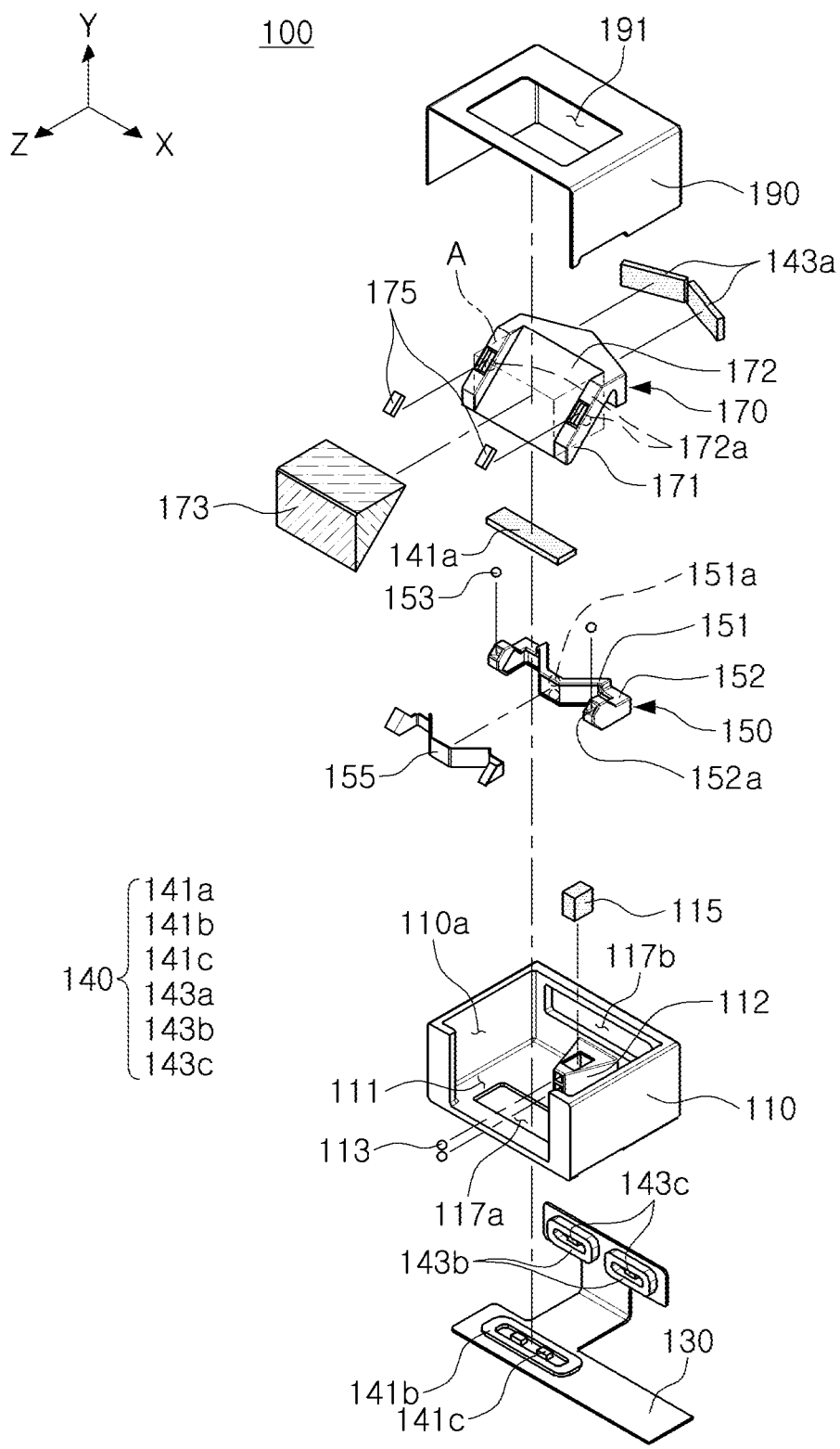
FIG. 2 is an exploded perspective view of the folded optics reflecting module of FIG. 1, according to an embodiment.
Figure 3:
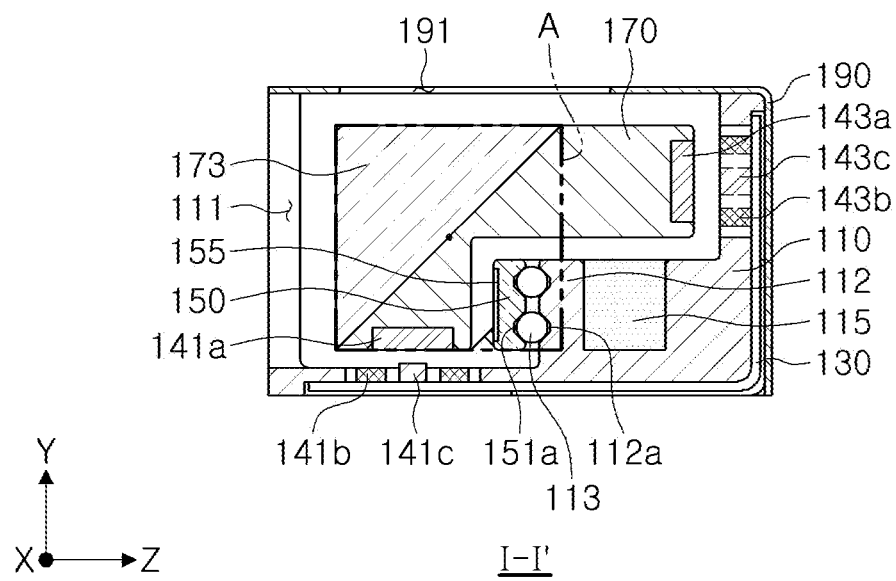
FIG. 3 is a cross-sectional view taken along line I-I' of FIG. 1.
Figure 4:
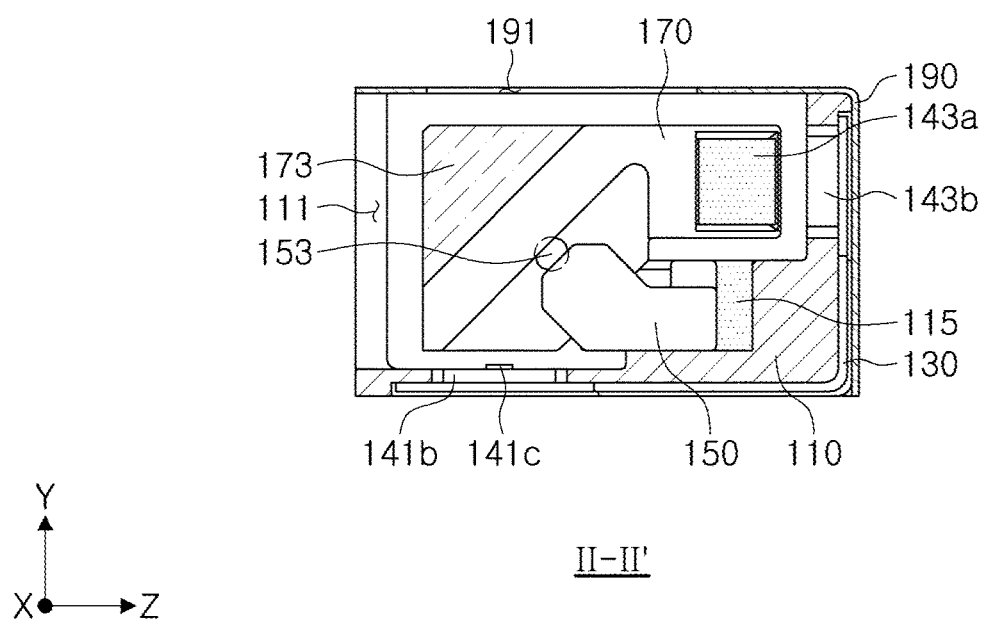
FIG. 4 is a cross-sectional view taken along line II-II' of FIG. 1.

As shown in FIG. 2, the driving holder 150 may include a main body 151, which is centrally located in the driving holder 150, and flanges 152 extending from the main body 151 at opposing sides of the main body. The main body 151 may be supported by the support protrusion portion 112, and the rotation holder 170 may be supported by the flanges 152 in a configuration in which the second ball bearings 153 are interposed between the flanges 152 and the rotation holder 170. Accordingly, the main body 151 may be positioned to oppose the support protrusion portion 112. For example, the main body 151 may be bent to surround the support protrusion portion 112. In addition, a virtual extension line connecting the two or more second ball bearings 153 may cross the inside of the rectangular parallelepiped A having surfaces on which surfaces of the reflective member 173 are disposed when the reflective member 173 is mounted on the seating portion 172 of the rotation holder 170, whereby a wide-angle rotation of the rotation holder 170 may be performed with respect to the first axis (X axis).

Each of the flanges 152 may have a shape extending from the main body 151 in an optical axis direction, for example. Third guide grooves 152a into which the one or more second ball bearings 153 are respectively inserted may be provided in end portions of the flanges 152. In such an example, since the second ball bearings 153 serves as bearings when the rotation holder 170 rotates with respect to the first axis (X axis), since the second ball bearings 153 are aligned in the first axis (X axis) direction, the third guide grooves 152a may be aligned in the first axis (X axis) direction. The second ball bearings 153 may have a spherical shape or cylindrical shape, and accordingly, the third guide grooves 152a may have a shape corresponding to the shape of the second ball bearings 153.

The rotation holder 170 may be closely coupled to the driving holder 150. The rotation holder 170 may be held against the flange 152 of the driving holder 150 in a state in which the second ball bearings 153 are interposed between the rotation holder 170 and the flanges 152 by a pulling force of the second pulling member 155 disposed in the driving holder 150 and the third pulling member 175 disposed in the rotation holder 170. The two or more second ball bearings 153 may be aligned in a first axis (X axis) direction or may have a cylindrical shape. Accordingly, the flanges 152 of the driving holder 150 may include the third guide grooves 152a so that the second ball bearings 153 are inserted in the third guide grooves 152a, and the rotation holder 170 may include fourth guide grooves 172a on surfaces facing the flanges 152, respectively, in the Y axis direction such that the second ball bearings 153 are inserted in the fourth guide grooves 172a.

The rotation holder 170 may include a main body 171 and the seating portion 172, and the seating portion 172 may be inclined so that the reflective member 173 may be coupled thereto. The reflective member 173 may be, for example, a prism, a mirror, or the like.

A driving portion 140 may include the first and second driving coils 141b and 143b mounted on the substrate 130 coupled to the housing 110, and the first and second magnets 141a and 143a disposed in the rotation holder 170, and may include the first and second position sensors 141c and 143c for measuring a rotation angle of the driving holder 150 and the rotation holder 170. The first and second position sensors 141c and 143c may be hall sensors, magnetic sensor, or optical sensors. One or two or more of each of the first and second position sensors 141c and 143c may be provided to oppose each of the first and second magnets 141a and 143a, respectively.

The first magnet 141a and the second magnet 143a may be disposed in the rotation holder 170. The first magnet 141a and the second magnet 143a may be disposed at positions opposite the through holes 117a and 117b, respectively, and may oppose the first coil 141b and the second coil 143b, respectively. The first magnet 141a and the second magnet 143a may oppose the first position sensor 141c and the second position sensor 143c, respectively.

For example, the first magnet 141a and the first coil 141b, which form a first driving portion of the driving portion 140, may provide power for the rotation holder 170 to rotate with respect to the first axis (X axis), and the first position sensor 141c may sense a rotation angle of the rotation holder 170 with respect to the first axis (X axis). The reflective member 173 may rotate about the first axis (X axis) with the rotation holder 170.

For example, the second magnet 143a and the second coil 143b, which form a second driving portion of the driving portion 140, may provide power for the driving holder 150 to rotate with respect to the second axis (Y axis), and the second position sensor 143c may sense a rotation angle of the driving holder 150 with respect to the second axis (Y axis). The rotation holder 170 and the reflective member 173 may rotate about the second axis (Y axis) along with the driving holder 150.

Figure 5:
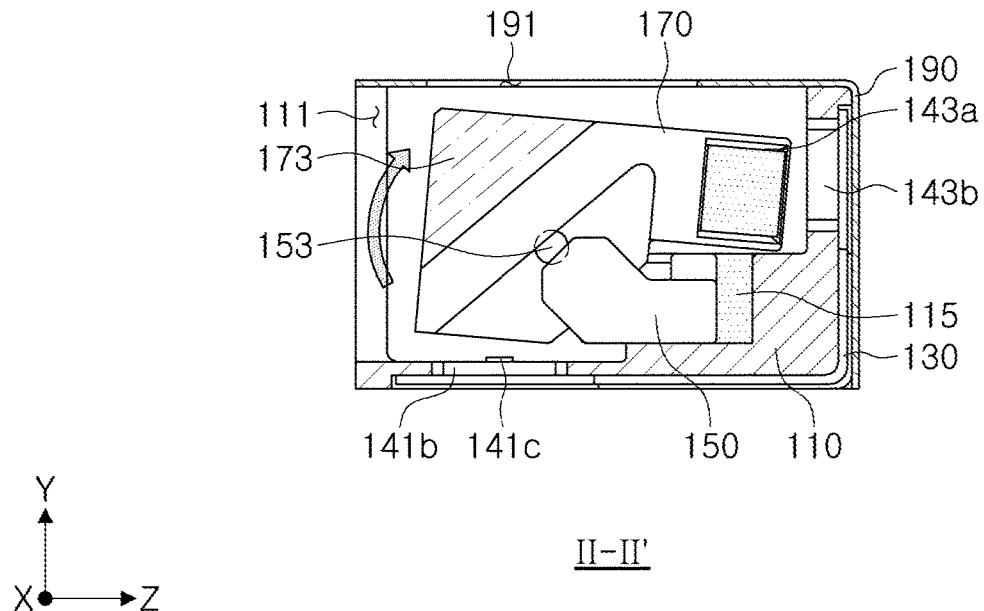
FIGS. 5 and 6 are views illustrating example rotational movements of a driving holder of the folded optics reflecting module of FIG. 1 about a first axis (X axis) perpendicular to an optical axis, according to an embodiment.
Figure 6:
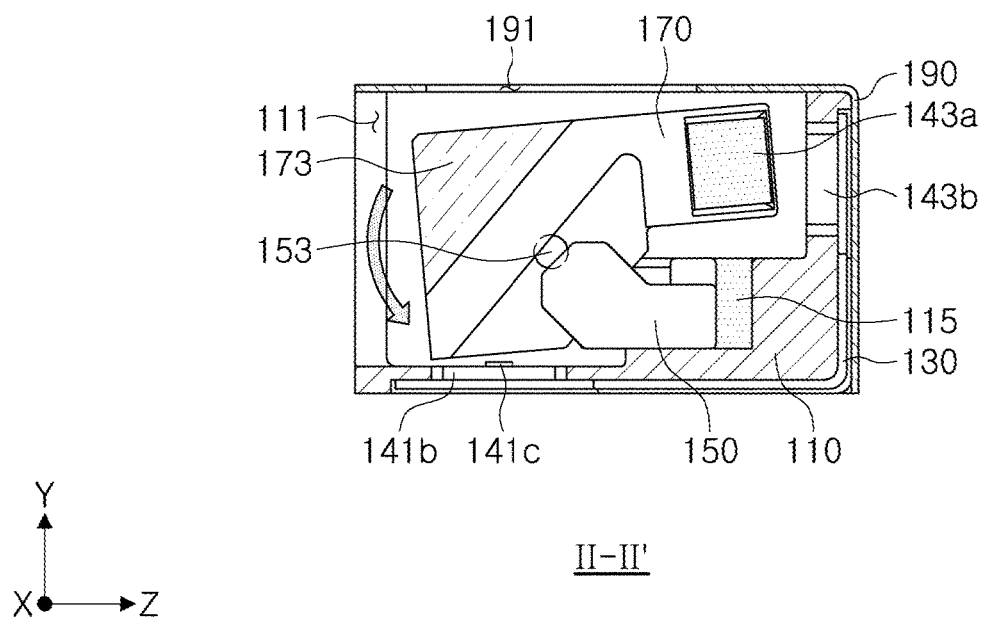
Figure 7:
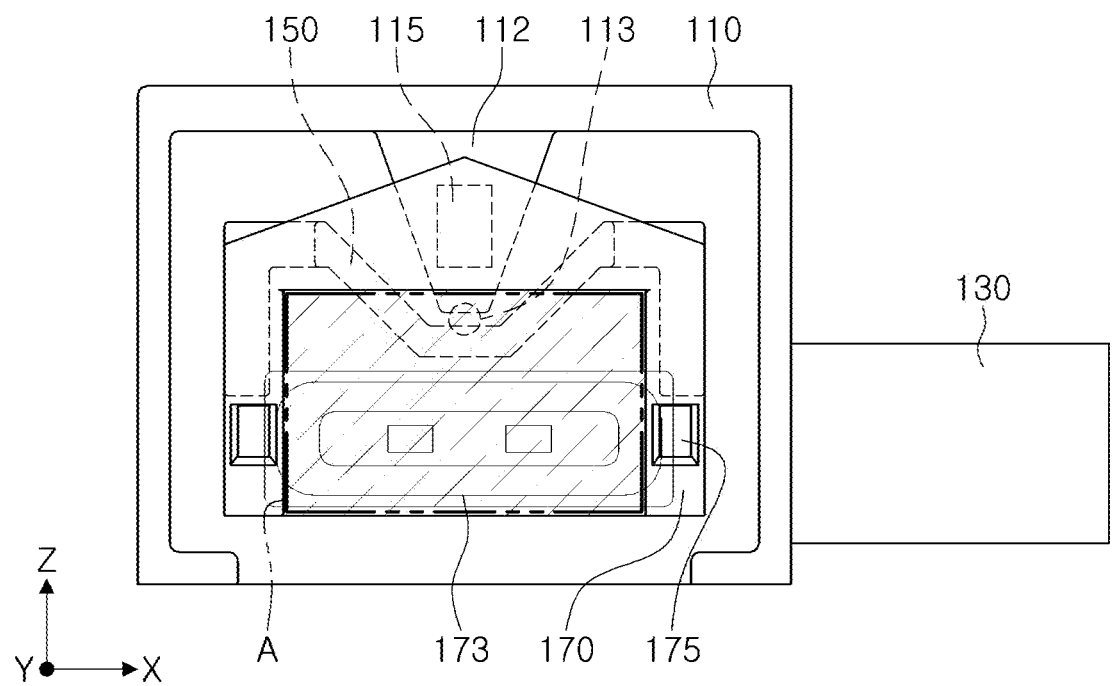
FIG. 7 is a plan view of the folded optics reflecting module of FIG. 1, wherein a cover of the folded optics reflecting module is removed, according to an embodiment.

Referring to FIGS. 5 and 6, a structure in which the rotation holder 170 rotates about the first axis (X axis) with respect to the driving holder 150 is illustrated. The rotation holder 170 may rotate about the first axis (X axis) with respect to the driving holder 150 by the first driving portion, as described above.

Figure 8:
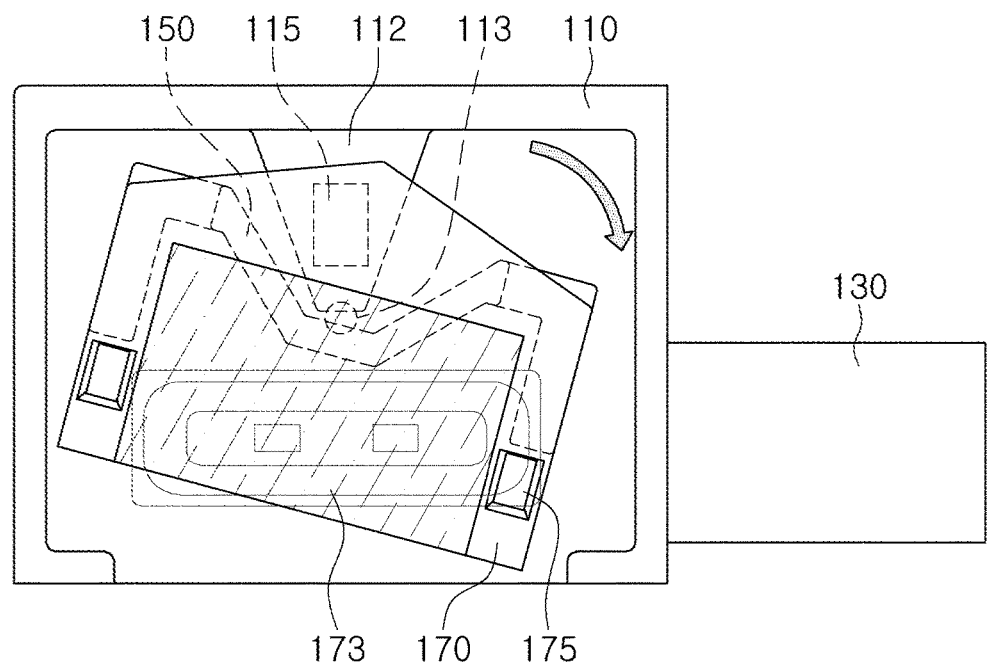
FIGS. 8 and 9 are reference views illustrating example rotational movements of the driving holder of the folded optics reflecting module of FIG. 1 about a second axis (Y axis) perpendicular to the optical axis, according to an embodiment.
Figure 9:
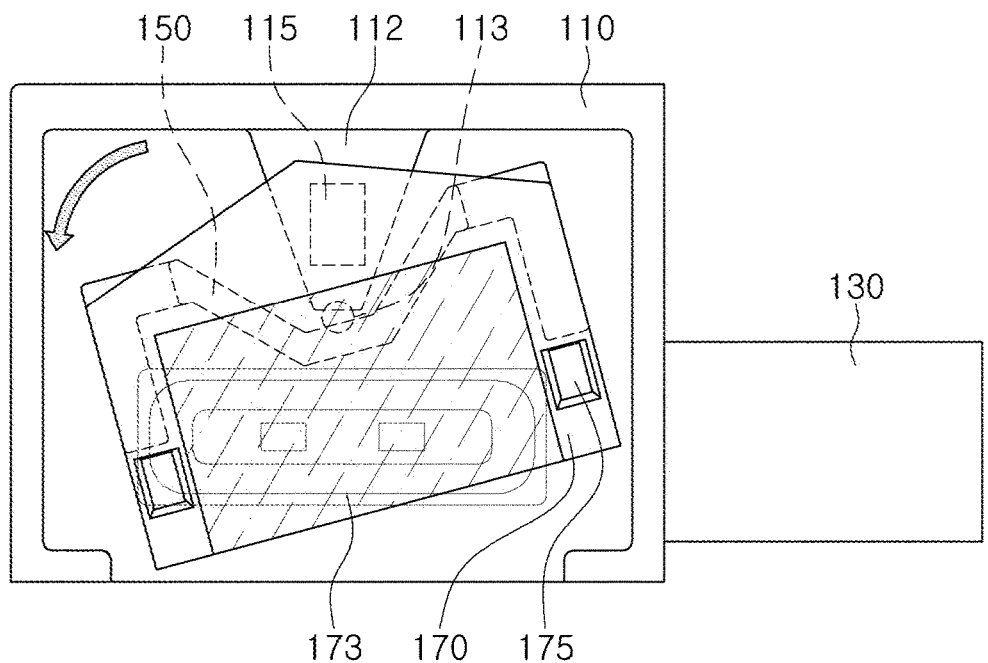
Figure 10:
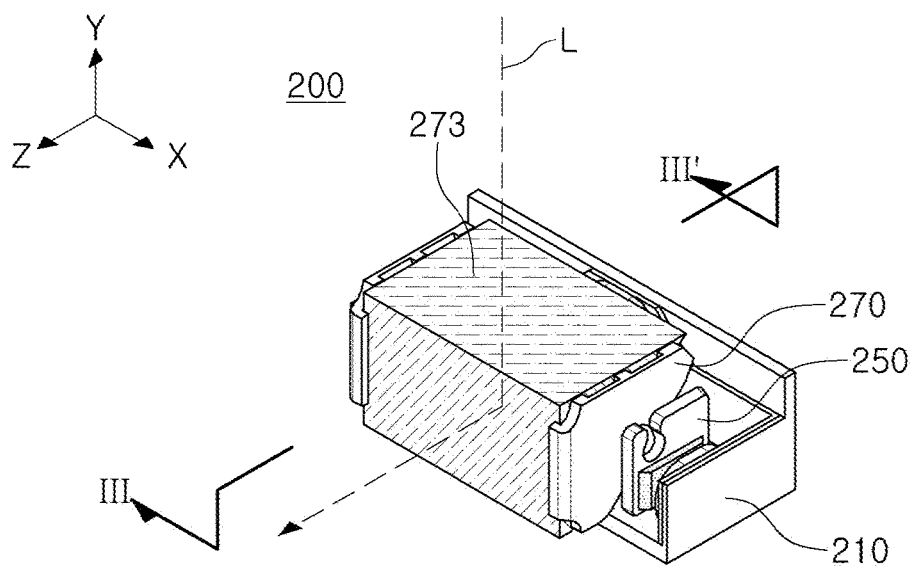
FIG. 10 is a combined perspective view of a folded optics module, according to an embodiment.
Figure 11:
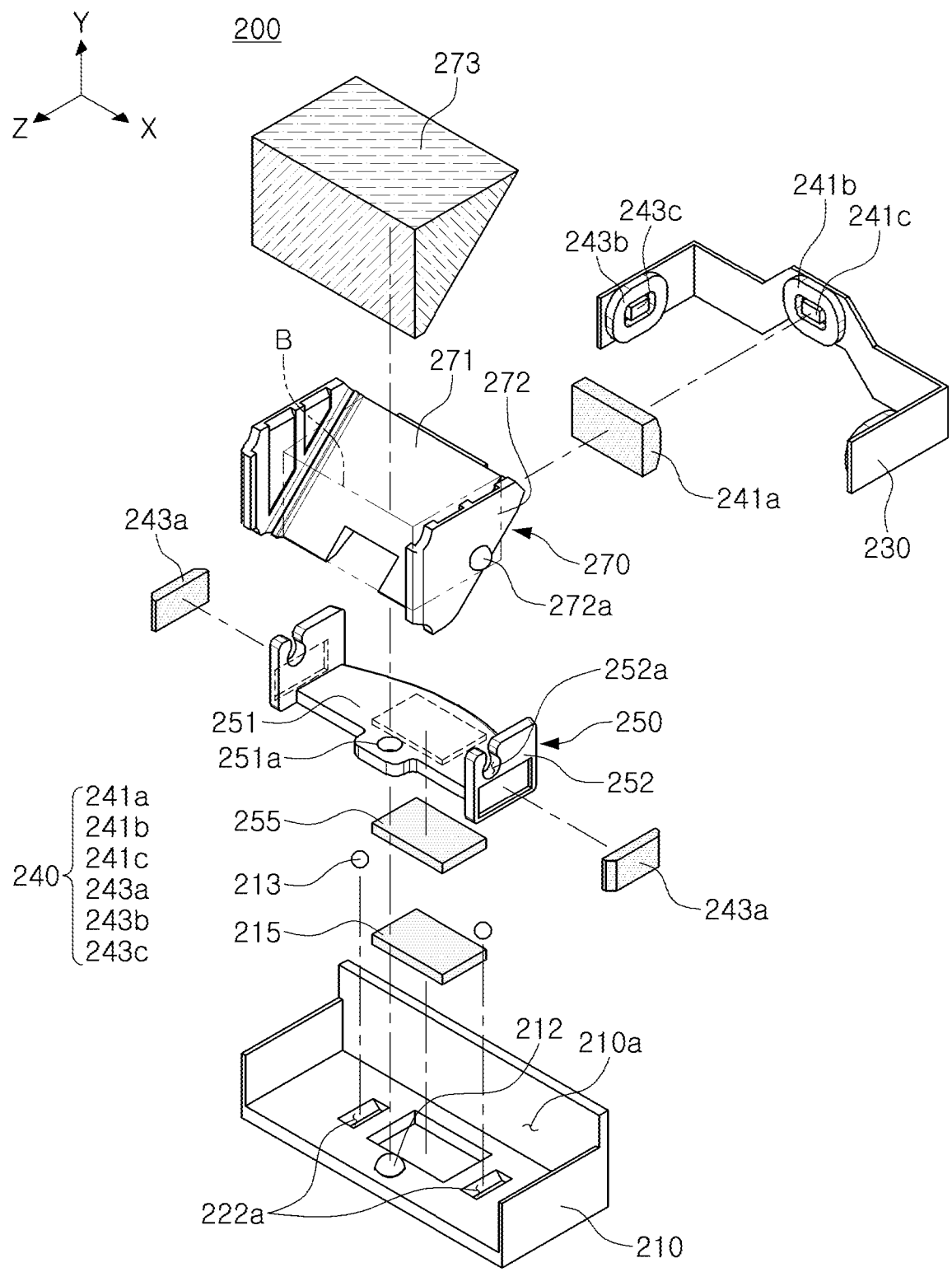
FIG. 11 is an exploded perspective view of the folded optics reflecting module of FIG. 10, according to an embodiment.
Figure 12:
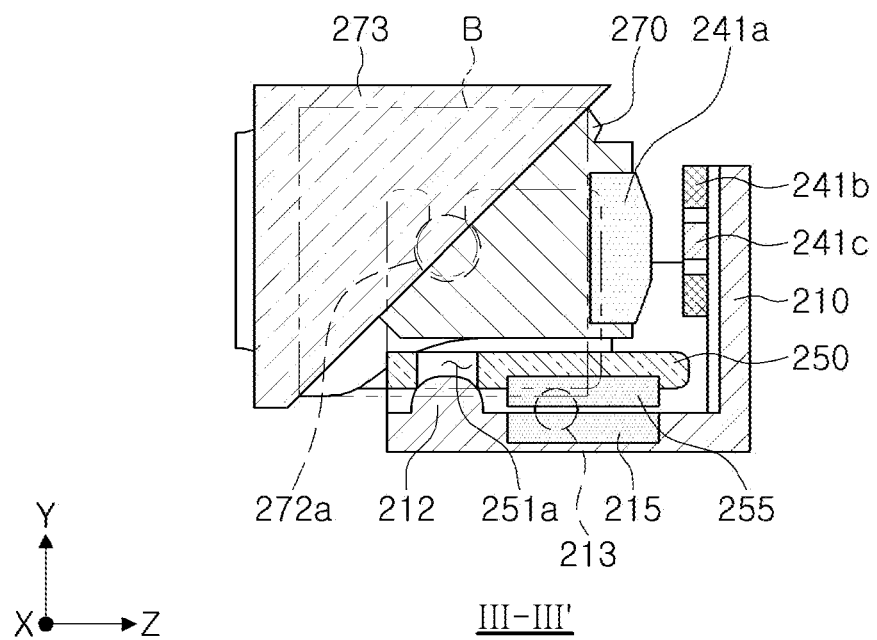
FIG. 12 is a cross-sectional view taken along line III-III' of FIG. 10.

Referring to FIGS. 8 and 9, a structure in which the driving holder 150 rotates about the second axis (Y axis) with respect to a support protrusion portion 112 of the housing 110 is illustrated. The driving holder 150 may rotate about the second axis (Y axis) with respect to the support protrusion portion 112 by the second driving portion, as described above.

Referring to FIGS. 10 to 12 and 15, a folded optics reflecting module 200 (hereinafter, "reflecting module 200"), according to an embodiment, may include a housing 210, a substrate 230, a driving holder 250, and a rotation holder 270. A cover for covering the housing 210 from above may also be included. The reflecting module 200 may allow incident light to be reflected by a reflective member 273 and exit the reflecting module 200 in the optical axis direction (Z direction) after an angle of a path of the light is changed.

The reflecting module 200 may be configured such that a wide-angle rotation of the reflecting module 200 may be performed utilizing a camera to implement a scanning function and a tracking technology on a plane in a manner similar to that of a scanning device. That is, a rotation angle of the reflecting module 200 may be sufficiently wide to enable the scanning function and the tracking technology. The reflecting module 200 of the may implement image stabilization as well as scanning.

The reflecting module 200 may include a rotary shaft of the driving holder 270 directly below or directly above a seating portion 271, which is an inclined surface of the driving holder 270 on which a reflective member 273 disposed, to implement a wide-angle rotation of the driving holder 270. In other words, the rotary shaft, which enables the rotation of the driving holder 270, is formed in the directions of the first axis (X axis) and the second axis (Y axis), respectively, and may be formed directly below or directly above the seating portion 271 of the driving holder 270. For example, the rotary shaft may be formed to cross an inside of a rectangular parallelepiped B (FIG. 11) having surfaces coinciding with surfaces of the reflective member 273 when the reflective member 273 is mounted the seating portion 271. For example, a side surface (in an XY plane) of the reflective member 273 and an upper surface (in an XZ plane) of the reflective member 273 may be respectively disposed on or may respectively correspond to/coincide with two surfaces of the rectangular parallelepiped B, the seating portion 271 and the may be disposed along a diagonal plane within the parallelepiped B, and the reflective member 273 may interface with the seating portion 271 along the diagonal plane.

The housing 210 may include an internal space 210a. The driving holder 250 and the rotation holder 270 may be sequentially stacked in the internal space 210a. That is, the rotation holder 270 may be disposed over the driving holder 250 in the Y axis direction. For example, the substrate 230 may be coupled to the housing 210 so as to at least partially surround an inner surface of the housing 210, and an upper portion of the housing 210 may be covered by a cover (not shown) to cover the internal space.

The housing 210 may have an open shape so that incident light is reflected and emitted from the housing 210. The substrate 230 may be coupled to the inner surface of the housing 210 such that first and second driving coils 241b and 243b and first and second position sensors 241c and 243c mounted on the substrate 230 are exposed to the internal space 210c. Alternatively, a substrate may be coupled to an outer surface of the housing 210, and a through hole may be provided in the housing to expose the first and second driving coils 241b and 243b and the first and second position sensors 241c and 243c to the internal space 210a.

The housing 210 may include a first pivot protrusion 212 in which the driving holder 250 is rotatably supported in the internal space 210a. Two or more ball bearings 213 may be provided to guide the driving holder 250 when the driving holder 250 rotates around the first pivot protrusion 212. Accordingly, first guide grooves 222a may be disposed on a bottom of the housing 210, and may be formed to be elongated such that the two or more ball bearings 213 may be respectively inserted in the first guide grooves 222a. The first guide grooves 222a may have a linear shape or an arc shape along a rotation direction of the driving holder 250.

The first pivot protrusion 212 may be a member configured to support the driving holder 250 to rotate with respect to the second axis (Y axis) perpendicular to the optical axis. Accordingly, the first pivot protrusion 212 may be a hemispherical protrusion protruding in the second axis (Y axis) direction, and may be integrally formed with the housing 210 on the bottom of the housing 210. A first pivot protrusion groove 251a may be disposed on a bottom surface of the driving holder 250 opposing the bottom of the housing 210, and the first pivot protrusion 212 may be rotatably inserted in the first pivot protrusion groove 251a. The first pivot protrusion groove 251a may have a shape of a hole or a hemispherical groove, for example. In an alternative embodiment, a first pivot protrusion may be formed in the driving holder 250, and a first pivot protrusion groove may be formed in the bottom of the housing. In another embodiment, first guide grooves may be formed on the bottom surface of the driving holder 250 instead of the bottom of the housing 210. In another example, the first pivot protrusion 212 may be a ball bearing that is separately formed. In such an example, pivot guide grooves may be provided at a bottom of the housing 210 and at the bottom surface of the driving holder 250 opposing the bottom of the housing 210, respectively, such that the ball bearing serving as the first pivot protrusion is inserted in the pivot guide grooves.

The housing 210 may include a first pulling member 215 configured to generate a pulling force by which the driving holder 250 is closely held against and supported by the first pivot protrusion 212 and the two or more ball bearings 213.

The first pulling member 215 may be disposed at a bottom surface of the housing 210, and a second pulling member 255 may be disposed in the driving holder 250. Since the driving holder 250 is closely supported by the first pivot protrusion 212, the first pulling member 215 and the second pulling member 255 may be a magnet and a yoke (a magnetic material), respectively, or the first pulling member 215 and the second pulling member 255 may be a yoke (a magnetic material) and a magnet, respectively. Furthermore, since the pulling force of the first pulling member 215 is to be applied to the second pulling member 255, the second pulling member 255 may be disposed at a position corresponding to a position of the first pulling member 215.

The substrate 230 may be coupled to the housing 210 so as to surround the inner surface of the housing 210, and the first and second driving coils 241b and 243b and the first and second position sensors 241c and 243c mounted on the substrate 230 may be exposed to the internal space 210a. The substrate 230 may be one of various types of substrates, such as a flexible substrate, a rigid substrate, or a substrate in which a rigid substrate is interconnected with a flexible substrate. In addition, the substrate 230 may include a plurality of separate substrate portions, or may be a single substrate that has an integrally formed structure.

The driving holder 250 may be closely coupled to the first pivot protrusion 212 of the housing 210. The driving holder 250 may be supported on the bottom of the housing by the pulling force of the first pulling member 215 and the second pulling member 255 in a configuration in which the first pivot protrusion 212 and the two or more ball bearings 213 are interposed between the first pulling member 215 and the second pulling member 255.

The driving holder 250 may rotate about the first pivot protrusion 212, and the two or more ball bearings 213 may guide the rotation of the driving holder 250 about the first pivot protrusion 212. Since the two or more ball bearings 213 are respectively inserted into the first guide grooves 222a provided in the bottom of the housing 210, a separate guide groove may not be provided on the bottom surface of the driving holder 250. This configuration may reduce restriction of a movement path of the two or more ball bearings 213, such that the rotation of the driving holder 250 may be guided more easily. In addition, a portion of the rotary shaft is formed by the first pivot protrusion 212, and may be formed to cross the inside of the rectangular parallelepiped B as described above, whereby a wide-angle rotation of the rotation holder 270/the reflective member 273 may be performed with respect to the second axis (Y axis).

The driving holder 250 may include a main body 251, which is centrally located in the driving holder 250, and flanges 252 extending from the main body 251 at opposing sides of the main body 251. The main body 251 may be supported by the first pivot protrusion 212, and two second pivot protrusions 272a of the rotation holder 270 may be respectively rotatably supported by the flanges 252, for example, by a joint structure. Accordingly, the main body 251 may have a flat shape opposing the first pivot protrusion 212. In addition, an extension line connecting the two second pivot protrusions 272a may cross the inside of the rectangular parallelepiped B, whereby a wide-angle rotation of the rotation holder 270 may be performed with respect to the first axis (X axis).

The flanges 252 may each have a shape extending obliquely (vertically) from a respective sides of the main body 251. The flanges 251 may include grooves or hole-shaped second pivot protrusion grooves 252a, respectively. In such an example, the second pivot protrusion 272a may function as a bearing when the rotation holder 270 rotates with respect to the first axis (X axis), the second pivot protrusion grooves 252a may be aligned in the first axis (X axis) direction. The second pivot protrusions 272a may be hemispherical, and accordingly, the second pivot protrusions 272a may be respectively rotatably inserted in the second pivot protrusion grooves 252a. For example, the second pivot protrusions 272a may be respectively coupled to the second pivot protrusion grooves 252a to form rotatable joints.

The rotation holder 270 may be rotatably coupled to the driving holder 250 about the first axis (X axis). The rotation holder 270 may include the two second pivot protrusions 272a, which are aligned in the first axis (X axis) and protrude in opposing directions in the first axis (X axis) direction. The second pivot protrusions 272a may be integrally formed with the rotation holder 270. The second pivot protrusions 272a may function as bearings when the rotation holder 270 rotates with respect to the first axis (X axis), and the second pivot protrusions 272a may be fitted to the second pivot protrusion grooves 252a of the driving holder 250, as described above.

In another embodiment, the second pivot protrusions may be provided in the driving holder 250, and the second pivot protrusion grooves may be provided in the rotation holder 270. In another embodiment, the second pivot protrusions 272a may be a pair of ball bearings that are separately, provided instead of being protrusions integrally formed with the rotation holder 270. In such an example, guide grooves into which the ball bearings are respectively inserted may be formed on opposing surfaces of the driving holder 250 and the rotation holder 270, which oppose each other in the first axis (X axis). Such guide grooves and ball bearings may be aligned in the first axis (X axis) direction.

The rotation holder 270 may include the seating portion 271 and flanges 272 extending from opposing sides of the seating portion 271. The seating portion 271 may be inclined so that the reflective member 273 may be coupled thereto. The reflective member 273 may be, for example, a prism, a mirror, or the like. The flange 272 include the hemispherical second pivot protrusions 272a which are aligned in the first axis (X axis) direction and protrude in the opposing directions in the first axis (X axis) direction.

A driving portion 240 may include the first and second coils 241b and 243b mounted on the substrate 230, first and second magnets 241a and 243a disposed on the driving holder 250 and the rotation holder 270, respectively, and the first and second position sensors 241c and 243c for measuring a rotation angle of the driving holder 250 and the rotation holder 270. For example, the first and second position sensors 241c and 243c may be hall sensors, magnetic sensors, optical sensors, or the like. One or two or more of the first and position sensors 241c and 243c may be provided to oppose each of the first and second magnets 241a and 243a, respectively.

The first magnet 241a and the second magnet 243a may be disposed in the rotation holder 270 and the driving holder 250, respectively. Alternatively, the first magnet 241a and the second magnet 243a may be disposed in the rotation holder 270.

The first magnet 241a and the second magnet 243a may oppose the first coil 241b and the second coil 243b, respectively. The first magnet 241a and the second magnet 243a may oppose the first position sensor 241c and the second position sensor 243c, respectively.

For example, the first magnet 241a and the first coil 241b may form a first driving portion of the driving portion 240, and may provide power for the rotation holder 270 to rotate with respect to the first axis (X axis), and the first position sensor 241c may sense a rotation angle of the rotation holder 270 with respect to the first axis (X axis). The reflective member 273 may rotate about the first axis (X axis) with the rotation holder 270.

For example, the second magnet 243a and the second coil 243b may form a second driving portion of the driving portion 240, and may provide power for the driving holder 250 to rotate with respect to the second axis (Y axis), and the second position sensor 243c may sense a rotation angle of the driving holder 250 with respect to the second axis (Y axis). The rotation holder 270 and the reflective member 273 may rotate about the second axis (Y axis) along with the driving holder 250.

Figure 13:
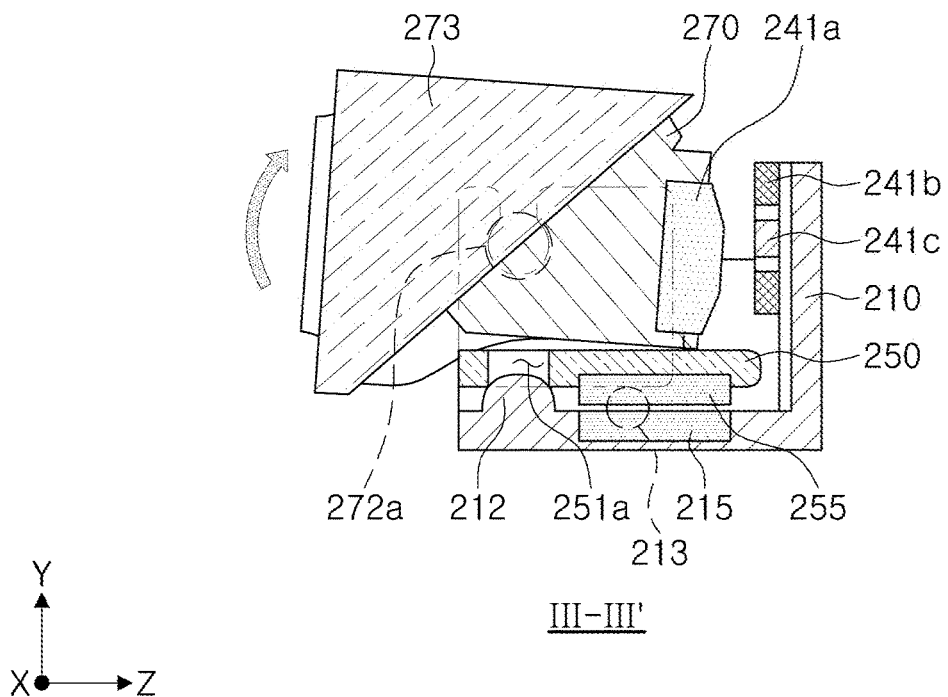
FIGS. 13 and 14 are views illustrating example rotational movements of a driving holder of the folded optics reflecting module of FIG. 10 about the first axis (X axis) perpendicular to the optical axis, according to an embodiment.
Figure 14:
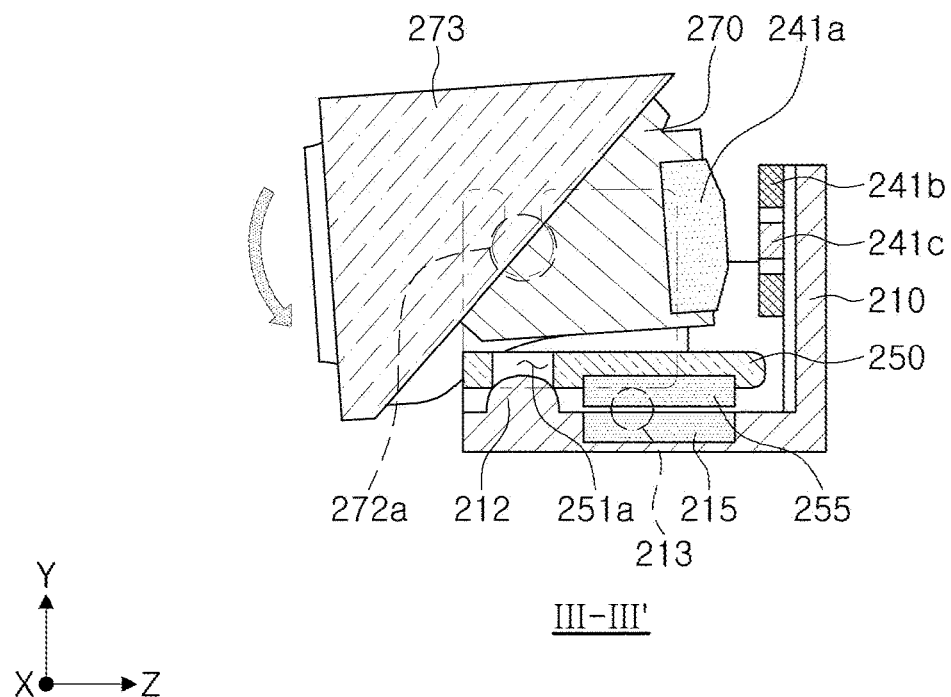
Figure 15:
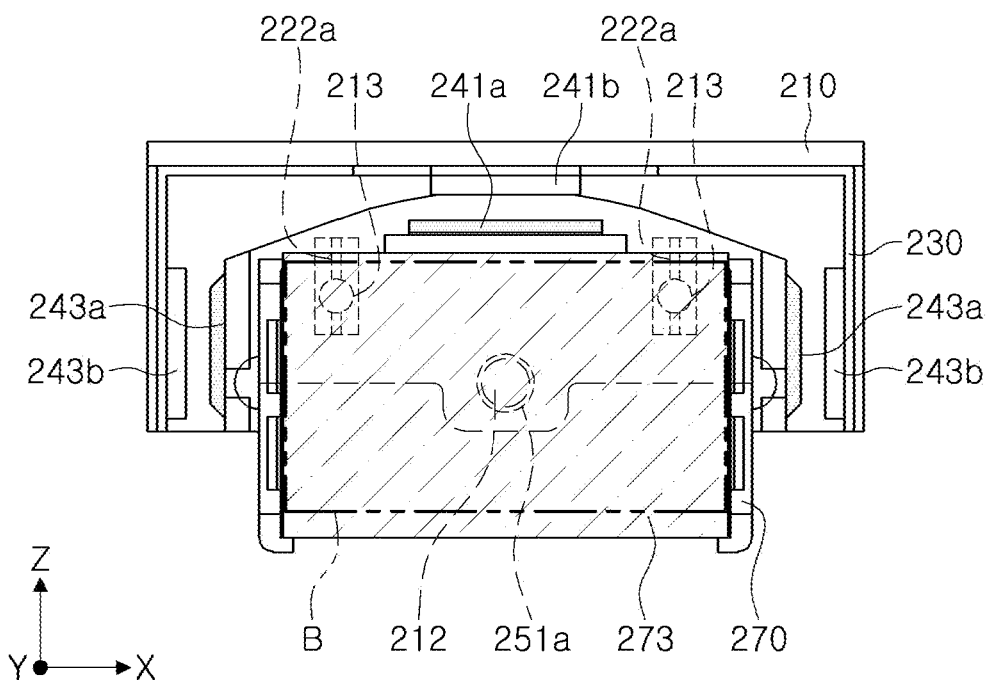
FIG. 15 is a plan view of the folded optics reflecting module of FIG. 10, wherein a cover of the folded optics reflecting module is removed, according to an embodiment.

Referring to FIGS. 13 and 14, a structure in which the rotation holder 270 rotates about the first axis (X axis) with respect to the driving holder 250 is illustrated. The rotation holder 270 may rotate about the first axis (X axis) with respect to the driving holder 250 by the first driving portion, as described above.

Figure 16:
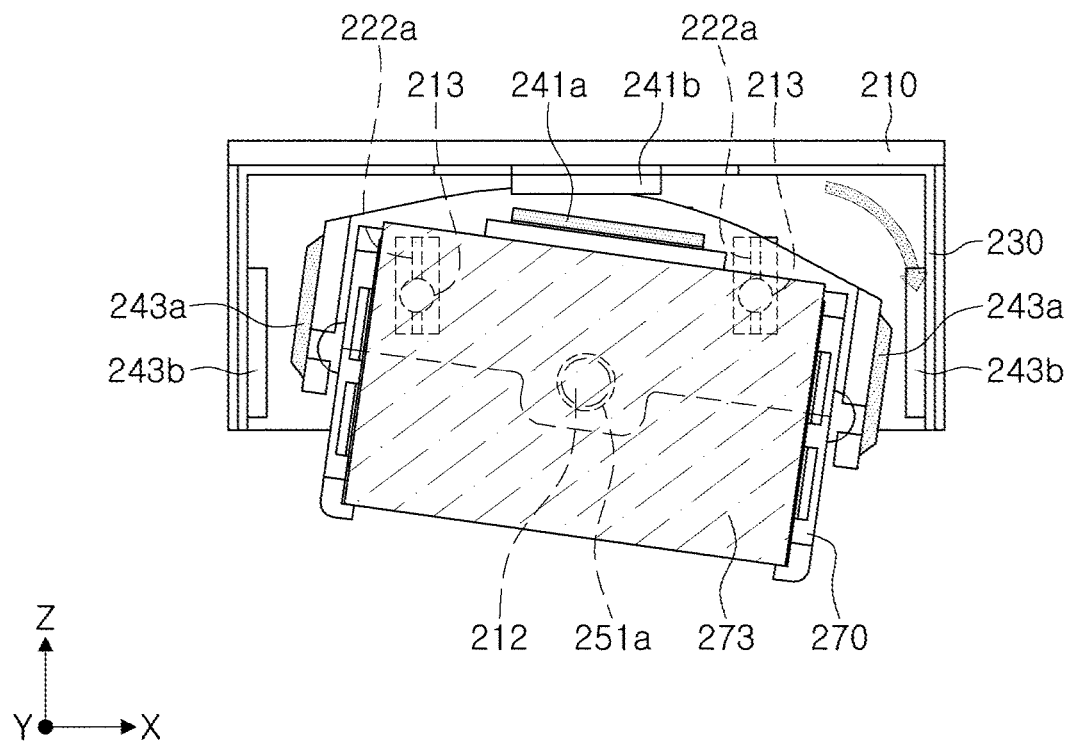
FIGS. 16 and 17 are views illustrating example rotational movements of the driving holder of the folded optics reflecting module of FIG. 10 about the second axis (Y axis) perpendicular to the optical axis, according to an embodiment.
Figure 17:
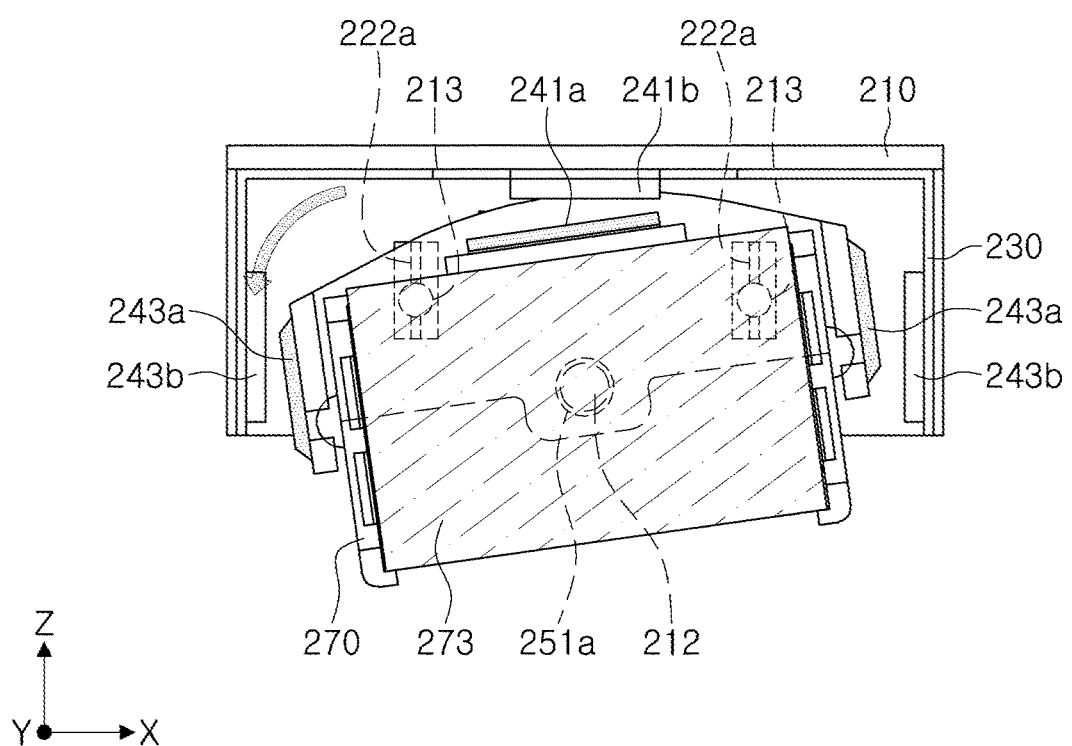

Referring to FIGS. 16 and 17, a structure in which the driving holder 250 rotates about the second axis (Y axis) about the first pivot protrusion 212 of the housing 210 as a center axis is illustrated. The driving holder 250 may rotate about the first pivot protrusion 212 about the center axis by the second driving portion, as described above.

As set forth above, according to embodiments disclosed herein, a reflection module included in a camera may be used to provide an efficient scanner function.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflecting module, comprising:
a housing;
a rotation holder supported by the housing, and comprising an inclined seating portion;
first ball bearings and second ball bearings disposed between the housing and the rotation holder; and
a reflective member disposed on the inclined seating portion,
wherein the rotation holder is rotatable with respect to a first axis passing through the first ball bearings and perpendicular to an optical axis of the housing, and with a second axis passing through the second ball bearings and perpendicular to the optical axis and the first axis, and
wherein the first and second axes cross an inside of a rectangular parallelepiped having a surface coinciding with a surface of the reflective member, and the reflective member interfaces with the seating portion along a diagonal plane within the parallelepiped.

2. The reflecting module of claim 1, wherein the housing comprises a support protrusion portion protruding in a direction of the optical axis, and
wherein a portion of an end of the support protrusion portion is disposed inside the rectangular parallelepiped.

3. The reflecting module of claim 1, further comprising a driving holder disposed between the housing and the rotation holder.

4. The reflecting module of claim 3, further comprising:
a first bearing configured to enable the rotation holder to rotate with respect to the first axis, and disposed between the housing and the driving holder; and
a second bearing configured to enable the rotation holder to rotate with respect to the second axis, and disposed between the rotation holder and the driving holder.

5. The reflecting module of claim 3, further comprising:
a first pulling member disposed in the housing;
a second pulling member disposed in the driving holder; and
a third pulling member disposed in the rotation holder,
wherein the second pulling member is configured to generate a pulling force with the first pulling member and the third pulling member.

6. The reflecting module of claim 5, wherein the second axis is disposed between the first pulling member and the second pulling member, or
wherein the first axis is disposed between the second pulling member and the third pulling member.

7. The reflecting module of claim 6, wherein the second pulling member has a bent shape such that the second pulling member opposes the first pulling member and the third pulling member.

8. The reflecting module of claim 3, wherein
the first ball bearings are disposed between the housing and the driving holder,
the second ball bearings are disposed between the rotation holder and the driving holder, and
the first ball bearings and the second ball bearings are aligned in different directions.

9. The reflecting module of claim 8, further comprising:
a first pulling member disposed in the housing;
a second pulling member disposed in the driving holder; and a third pulling member disposed in the rotation holder,
wherein the second pulling member is configured to generate a pulling force with the first pulling member and the third pulling member,
wherein the first ball bearings are disposed between the first pulling member and the second pulling member, and
wherein the second ball bearings are disposed between the second pulling member and the third pulling member.

10. The reflecting module of claim 3, further comprising:
a first pulling member disposed in the housing; and
a second pulling member disposed in the driving holder,
wherein the second pulling member is configured to generate a pulling force with the first pulling member.

11. The reflecting module of claim 10, further comprising bearings disposed between the housing and the driving holder.

12. The reflecting module of claim 1, further comprising:
a first magnet configured to provide power to rotate the rotation holder with respect to the first axis; and
a second magnet configured to provide power to rotate the rotation holder with respect to the second axis.

13. The reflecting module of claim 12, further comprising:
a first coil disposed on a surface parallel to the optical axis and configured to act on the first magnet; and
a second coil disposed on a surface perpendicular to the optical axis and configured to act on the second magnet.

14. The reflecting module of claim 12, wherein the first magnet is disposed in a position biased toward an end portion of the housing in a direction of the optical axis on a surface of the rotation holder parallel to the optical axis.

15. The reflecting module of claim 12, wherein the second magnet is disposed in a position biased toward an end portion of the housing in a direction of the second axis on a surface of the rotation holder perpendicular to the optical axis.

16. A reflecting module, comprising:
a housing;
a rotation holder supported by the housing, and comprising an inclined seating portion;
a driving holder disposed between the housing and the rotation holder, and configured to rotate about a pivot protrusion;
a second pivot protrusion disposed on the rotation holder or the driving holder; and
a reflective member disposed on the inclined seating portion,
wherein the rotation holder is rotatable with respect to a first axis passing through the first pivot protrusion and perpendicular to an optical axis of the housing, and with respect to a second axis passing through the second pivot protrusion and perpendicular to the optical axis and the first axis.

17. The reflecting module of claim 16, wherein the rotation holder further comprises a rotary shaft coupled to the driving holder.

18. The reflecting module of claim 16, further comprising ball bearings disposed between the housing and the driving holder.

* * * * *